United States Patent
Patterson

(10) Patent No.: US 7,058,366 B2
(45) Date of Patent: Jun. 6, 2006

(54) WIRELESS TERMINAL PROVIDING SOUND PRESSURE LEVEL DISSIPATION THROUGH CHANNELED PORTING OF SOUND

(75) Inventor: Gregory S. Patterson, Morrisville, NC (US)

(73) Assignee: Sony Ericsson Mobile Communications AB (SE)

( * ) Notice: Subject to any disclaimer, the term of this patent is extended or adjusted under 35 U.S.C. 154(b) by 417 days.

(21) Appl. No.: 10/065,996

(22) Filed: Dec. 9, 2002

(65) Prior Publication Data
US 2004/0198239 A1  Oct. 7, 2004

(51) Int. Cl.
*H04B 1/38* (2006.01)

(52) U.S. Cl. ............ 455/90.3; 455/575.1; 455/569.1; 455/575.4; 379/428.01; 379/420.02; 379/433.02; 381/313; 381/325; 381/380

(58) Field of Classification Search ............ 455/575.1, 455/350, 351, 90.3, 569.1, 575.4, 347; 379/419, 379/433.01, 433.03; 381/313, 325, 380
See application file for complete search history.

(56) References Cited

U.S. PATENT DOCUMENTS

| | | | |
|---|---|---|---|
| 4,418,248 A | 11/1983 | Mathis | 179/156 |
| 4,727,583 A | 2/1988 | Weber | 381/90 |
| 4,907,266 A | 3/1990 | Chen | 379/430 |
| 5,058,154 A | 10/1991 | Andersen | 379/433 |
| 5,155,773 A | 10/1992 | Hansen | 381/194 |
| D333,468 S | 2/1993 | Hansen | D14/222 |
| 5,333,206 A | 7/1994 | Koss | 381/183 |
| 5,610,992 A | 3/1997 | Hickman | 381/188 |
| 5,642,402 A | 6/1997 | Vilmi et al. | 379/58 |
| 5,655,017 A * | 8/1997 | Fishman | 379/420.02 |
| 5,729,605 A * | 3/1998 | Bobisuthi et al. | 379/430 |
| 5,790,679 A * | 8/1998 | Hawker et al. | 381/163 |
| 5,805,708 A * | 9/1998 | Freadman | 381/345 |
| 5,905,805 A | 5/1999 | Hansen | 381/398 |
| 6,064,894 A * | 5/2000 | Zurek et al. | 455/569.1 |
| 6,144,738 A * | 11/2000 | Hawker et al. | 379/433.02 |
| 6,154,666 A | 11/2000 | Patterson et al. | 455/575 |
| 6,163,610 A * | 12/2000 | Bartlett et al. | 379/433.01 |
| 6,239,393 B1 | 5/2001 | Hansen | 200/276 |
| 6,285,771 B1 * | 9/2001 | Killion et al. | 381/313 |

(Continued)

FOREIGN PATENT DOCUMENTS

GB    2310559    8/1997

(Continued)

OTHER PUBLICATIONS

U.S. Appl. No. 10/065,330, Hansson.

(Continued)

*Primary Examiner*—Marceau Milord
(74) *Attorney, Agent, or Firm*—Moore & Van Allen PLLC; Matthew W. Witsil

(57) ABSTRACT

Apparatus for reducing the sound pressure level (SPL) heard by a user of a mobile terminal, such as a cellular phone, when listening with an ear sealed to the mobile terminal and for providing adequate sound when the ear is not sealed to the mobile terminal. Some sound is laterally ported away from the ear-sealing region on the terminal such that the SPL heard with a sealed ear may be controlled to be within regulatory requirements. The need for mechanical or proximity switches may be reduced or eliminated. Adequate SPLs are provided when the ear is not sealed to the device by the combined use of distal and central ports. Excessive SPLs may be prevented for sounds such as alert signals.

23 Claims, 4 Drawing Sheets

U.S. PATENT DOCUMENTS

| | | | |
|---|---|---|---|
| 6,321,070 B1 * | 11/2001 | Clark et al. ............... | 455/575.1 |
| 6,337,908 B1 | 1/2002 | Andersen ............... | 379/433.02 |
| 6,553,119 B1 | 4/2003 | Mori | |
| 6,819,946 B1 * | 11/2004 | Hansson ................. | 455/569.1 |

FOREIGN PATENT DOCUMENTS

| | | |
|---|---|---|
| JP | 11104785 | 4/1999 |
| WO | WO 00/21330 | 4/2000 |
| WO | WO 01/33904 A1 | 5/2001 |

OTHER PUBLICATIONS

U.S. Appl. No. 10/376,938, Eaton.

"Design of mobile and cordless hand-set offering a major improvement in sound quality" Kirk Acoustics, Horsens, Denmark, Sep. 1997.

"Leak Tolerant Dynamic Receivers Mobile and Cordless Telephone handset design", Kirk Acoustics A/S, Horsens, Denmark, Feb. 2000.

Patent Cooperation Treaty, International Search Report, PCT/EP03/13965, Dec. 9, 2003.

Sony Ericsson Mobile Communications AB, International Application No., PCT/EP03/13965, Written Opinion, Oct. 1, 2004.

Sony Ericsson Mobile Communications AB, International Application No., PCT/EP03/13965, International Preliminary Examination Report, Apr. 6, 2005.

* cited by examiner

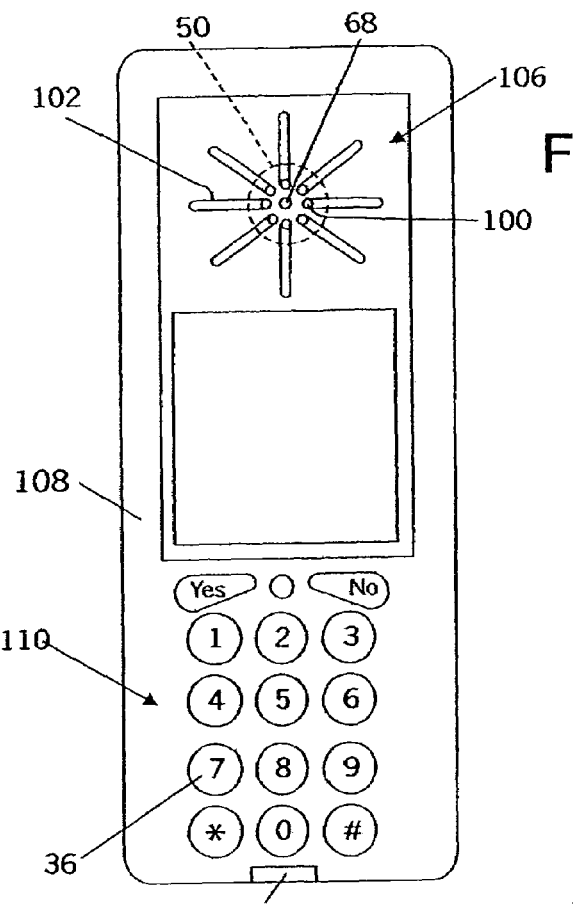
FIG. 9
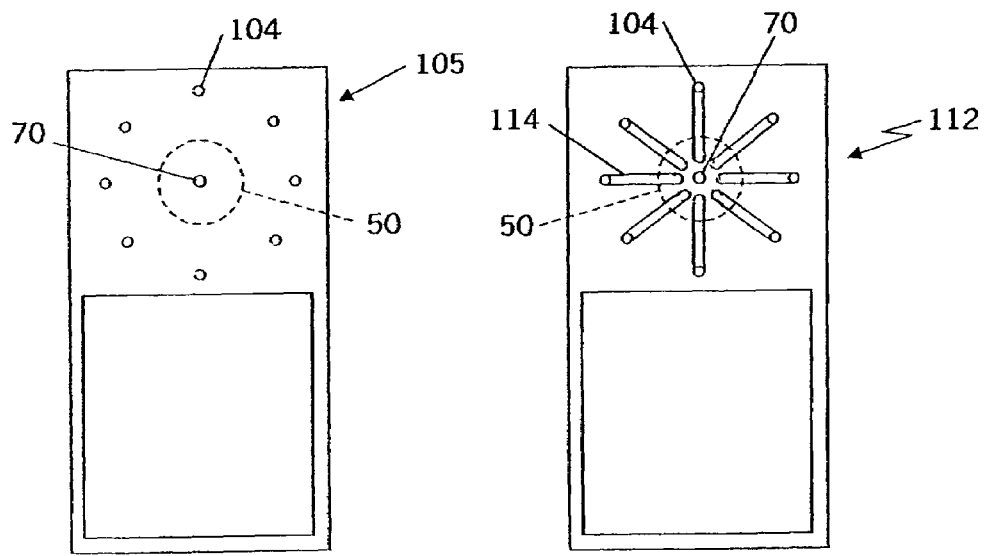
FIG. 10
FIG. 11

WIRELESS TERMINAL PROVIDING SOUND PRESSURE LEVEL DISSIPATION THROUGH CHANNELED PORTING OF SOUND

BACKGROUND OF INVENTION

Cellular phones and other like products often use two devices for generation of sound to be heard by a user. A transducer acts as a receiver, which in simple terms is a receiver or speaker. A separate unit, such as a buzzer, functions to provide alert signals to the user. Alert signals include ring tones when a call is being received, system signals such as to indicate a low battery, and other sounds such as tones for electronic games. These alert tones generally need to be of sufficient volume to be heard in a noisy environment. In some cases the buzzer may instead be a second speaker. Similar functions are provided in this configuration: One speaker generally acts to provide sound for a user to hear in a phone call, and the other speaker provides sound for alert functions.

With the introduction of polyphonic ring tones, where instead of just rings or buzzes the alert could be a song or portion of a song, a buzzer is less desirable because it cannot produce the tonal qualities necessary. The speaker function for polyphonic and alert functions requires a higher sound pressure level than standard receiver functionality permits. A speaker is therefore preferred for this application. Using a speaker that provides voice sound for the alert function, however, generally causes the required sound pressure level (SPL) limit to be exceeded. Numerous standards, including OSHA (Occupational Safety & Health Administration), TIA (Telecommunications Industry Association), CTIA (Cellular Telecommunications and Internet Association) standards specify a safety limit, currently 115–120 dBSPL to prevent hearing loss in normal use. This limit is below the required level of most alert functions, which is typically around 135–140 dBSPL.

Some attempts at solutions to these problems include (1) using a separate speaker for the alert tones and (2) using a single speaker to perform alert and receiver functions with a variety of mitigation techniques. When a separate speaker is used for alert tones, often the sound from the separate speaker is directed out the sides or back of the phone. This prevents those higher sound pressure level tones from being able to project from the normal receiver location. Further, use of the second speaker has implications on the cost and size of the unit.

When a single speaker is used to perform alert and receiver functions, one approach is to port the majority of the sound out the side or back of the phone to limit the SPL in the receive mode to 115–120 dBSPL. This results in a loss of privacy, however, since all conversation is then similarly ported out the side, back, or both. Additional design features may be added, such as mechanical switches, or proximity switches that activate the mechanical switches, to close off the side or back ports. Though this can limit privacy loss, it generally adds cost and complexity, and in the event that there is an alert signal generated while the side or back ports are closed, SPL levels can result that exceed the 115–120 dBSPL requirement at the receiver. Proximity switches can also be somewhat unreliable or can result in undesired reduction in alert signal volume when the phone is carried on the person, as in a case, a pocket, or other enclosure.

Another option includes software solutions where the alert tones are ramped from a lower level to a high level over a set time period to allow the user to manually move the phone away from the ear before the high level sounds are generated. The possibility still exists, however, for an individual to accidentally have the receiver to his or her ear when an alert sound is being generated.

SUMMARY OF INVENTION

The present invention provides apparatus and methods for reducing the sound pressure level (SPL) heard by a user of a mobile terminal, such as a cellular phone, when listening with an ear sealed to the mobile terminal. In addition, an adequate SPL is provided when the user's ear is not sealed to the terminal, and an excessive SPL is reduced or prevented for sounds such as alert signals. The apparatus is directed to a mobile terminal, for example, a cellular phone, for providing sound pressure level dissipation of sound from a transducer inside the terminal; methods according to the present invention are for providing similar sound pressure level dissipation.

One embodiment of the present invention includes a front housing having a front face and a rear face. The front housing has a listening area and at least one first port through it. A back housing is mounted to the front housing to form an enclosure in which the transducer is disposed. A plate is mounted to the front face or rear face, and has at least one first port not aligned with the first port through the front housing listening area. At least one channel extends generally laterally between the first port through the front housing and the first port through the plate.

In another embodiment, in addition to the ports discussed above, one port is be within an ear-sealing region of the listening area and through the front housing, and a port through the plate is coaxial with the port through the front housing. Further, the plate may be mounted to the rear face of the housing, with the first port through the plate within the ear-sealing region and the first port through the housing outside the era-sealing region. Alternatively, the plate may be mounted to the front face of the housing, with the first port through the plate outside the ear-sealing region and the first port through the housing inside the ear-sealing region. Channels may be formed from recessed areas in mating parts, such as the front housing and the plate, or by ducts.

In one embodiment the enclosure is sealed on all sides except the front, and in yet another only one transducer is used.

In another embodiment a bezel is used similarly to the plate described above and is mounted to the front face of the housing.

In some embodiments the mobile terminal comprises a front housing having a listening area, an ear-sealing region within the listening area, a front face, and a rear face, and a back housing mounted to the front housing to form an enclosure in which the transducer is disposed. First means are provided for transmitting sound to the ear-sealing region, and second means are provided for transmitting sound from within the ear-sealing region to the listening area outside of the ear-sealing region. The first means may comprise at least one first port through the front housing, and a plate mounted to the front face or rear face, the plate having at least one first port therethrough generally coaxial with the at least one first port through the front housing. The second means may comprise at least one second port through the front housing and at least one second port through the plate not coaxial with the at least one first port through the front housing, and at least one channel extending generally perpendicularly from the axis of and laterally between the at least one port through the front housing and the at least one port through the plate. The plate may be mounted to the rear of the front housing, in which case the second port through the plate is within the ear-sealing region, and the second port of the front housing is outside the ear-sealing region. Alternatively, the plate may be mounted to the front face of the front housing, in which case the second port through the front housing is within the ear-sealing region, and the second port through the plate is outside the ear-sealing region.

A method for providing sound pressure dissipation comprises the step of transmitting sound through a channel from inside a mobile terminal enclosure and within the ear-sealing region to a listening area of a front housing outside the ear-sealing region.

The method may further comprises the steps of transmitting sound through a port within the enclosure and within an ear-sealing region to one end of the channel, and transmitting sound from the other end of the channel through a port opening to the listening area and outside the ear-sealing region.

Another method is provided, comprising the steps of providing a front housing having a front face and a rear face, the front housing having a listening area and at least one first port therethrough, providing a back housing mounted to the front housing to form an enclosure in which the transducer is disposed, providing a plate mounted to the front face or rear face, the plate having at least one first port therethrough not axially aligned with the at least one first port through the front housing listening area, and providing at least one channel extending generally perpendicularly from the axis of and laterally between the at least one first port through the front housing and the at least one first port through the plate.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF DRAWINGS

FIG. 9 is a cut-away front elevation view of another embodiment of a cellular phone according to the present invention.

FIG. 10 is a front elevation view of an embodiment of a bezel, to be added to the cellular phone of FIG. 9.

FIG. 11 is a rear elevation view of an additional embodiment of a bezel, again to be added to the cellular phone of FIG. 9.

DETAILED DESCRIPTION

As used herein, the term mobile terminal may include a cellular radiotelephone with or without a multi-line display, a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Certain terminology is also used herein for convenience only and is not to be taken as a limitation on the invention. For example, words such as "front," "back," "top," "bottom," "side," upper, and lower merely describe the configuration shown in the Figures. The components may be oriented in any direction and the terminology, therefore, should be understood as encompassing such variations unless specified otherwise. When the term phone is used herein, it should be understood to refer to any mobile terminal and that references to phones are also for convenience. In addition, the terms hole and port are used interchangeably.

Figure 1:
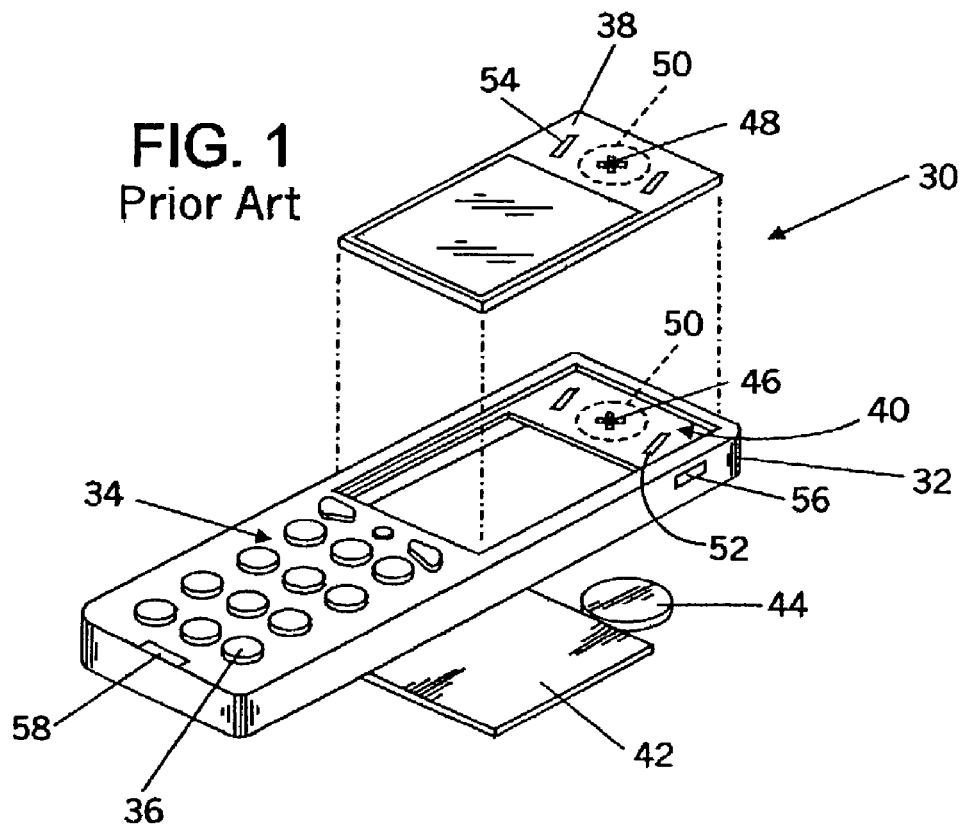
FIG. 1 is a partial exploded perspective view of a prior art cellular phone.

Referring now to the drawings, wherein like reference numerals illustrate corresponding or similar elements throughout the several figures, FIG. 1 shows a prior art cellular phone 30. The phone 30 comprises a front housing 32, a front face 34, keypad 36, a bezel 38, a recessed area to receive the bezel 38 including a listening area 40, a display 42, and a transducer or speaker 44. Five holes 46 are shown in the listening area 40 of the front face 34 and front housing 32. Often sound is projected to a user's ear through holes in a front housing and then through matching holes in a bezel. This system is designed to produce the desired tonal qualities and frequency ranges. In the phone of FIG. 1, five holes 46 generally match coaxially with the five holes 48 in the bezel 38, providing direct porting of sound from the transducer 44 through the holes 46, 48. Additional matching ports 52, 54 through the listening area 40, side ports 56 through the sides of the front housing 32, and back ports through the back housing (not shown) may also be provided. Side and back ports, however, tend to diminish privacy, and direct porting through the matching holes 52, 54 can cause too high an SPL to reach the user's ear if the holes are too close to or within the sealing region of the ear. Some conventional phones also include an additional transducer or a buzzer, not shown in FIG. 1. A back housing and microphone are also omitted from FIGS. 1 and 2, though an opening 58 for a microphone is shown.

A central portion of the listening area 40 and the comparable part of the bezel 38 define the sealing region 50 where a person's ear may be sealed against the bezel 38. When the user's ear is sealed against the phone 30, the ear becomes part of the acoustic circuit. The ear-sealing region 50 is typically measured by a diameter of approximately 25 mm where it is possible for the user to seal his or her ear opening to the listening area.

Figure 2:
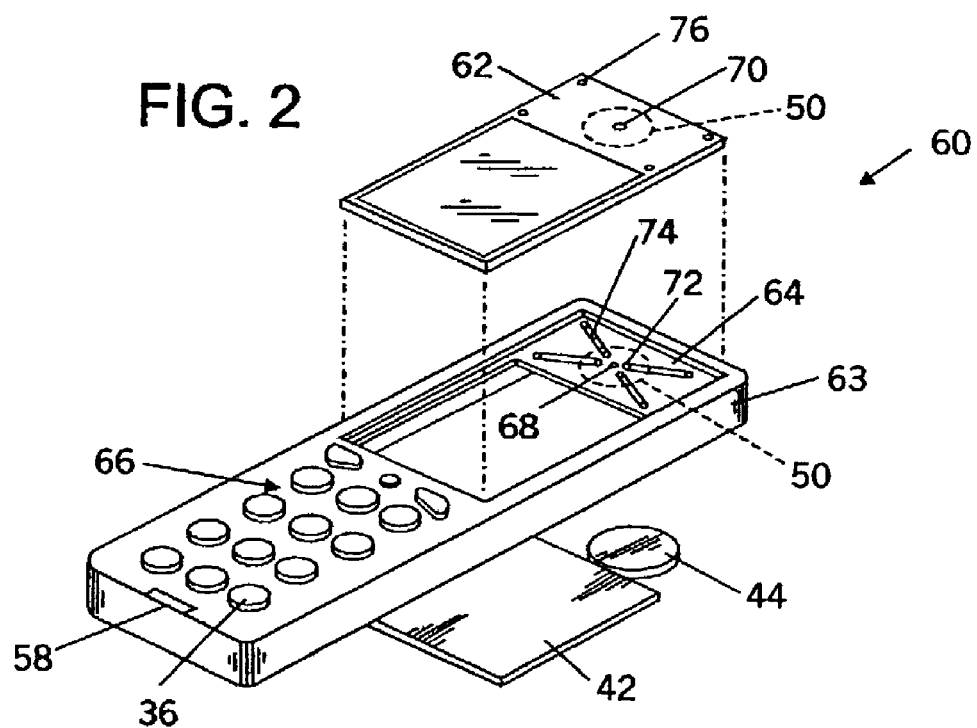
FIG. 2 is a partial exploded view of an embodiment of a cellular phone according to the present invention.

In the phone 60, or more broadly, the mobile terminal of FIG. 2, which is one embodiment of the present invention, the bezel 62 and the front housing 63, and accordingly the listening area 64 of the front face 66, differ from those parts 32, 38, 40, 34 in the phone 30 of FIG. 1. Only a small amount of the sound from the speaker 44 is ported directly to where the ear can be sealed 50 through one hole 68 through the listening area 64 and a corresponding hole 70 through the bezel 62. The rest of the sound is ported to the fringes of the front housing 63 through holes 72 in the listening area 64 that have no direct corresponding holes in the bezel 62, but instead connect to respective channels 74 in between the bezel 62 and the listening area 64. The ports 72 that connect to the channels 74 are shown within the ear-sealing region 50 but also may be located outside the sealing region 50. Each channel 74 connects to a hole 76 that is in a corner of the bezel 62.

More important than the exact location of the holes 76 is that these holes are outside the sealing region 50 of a user's ear. It is in the sealed condition that the SPL is measured and cannot exceed 115–120 dBSPL. Once the ear becomes unsealed, the acoustic circuit provided by the direct porting through matching holes 70, 72 is broken and the leak path through the channels 74 quickly degrades the SPL level, minimizing safety risks. So by porting the sound to areas outside the sealed ear area 50, the risk of exceeding the SPL limits is reduced while still allowing for higher overall SPL levels for sound. Such higher levels may be achieved through use of all of the openings 70, 76, and include sounds such as alert signals.

In the embodiments discussed herein, sound is ported to the front of the phone, as opposed to the side or back. The ported channels are directed outside of the sealed ear area. There are certain benefits to porting sound only to the front. Porting sound to the front causes all conversation to be projected toward the user. By setting the volume level of the receiver properly, only the level of sound required for conversation is used, and all sound goes toward the user. Directing sound only to front improves privacy for the user. Further, because the great percentage of users do not seal the ear or do, in most cases, hold the phone away from their ear for optimum sound transmission, these additional port openings can result in higher useful SPL levels or accentuated tuning frequencies of sound that the user experiences. However, although front porting is discussed and shown, in addition back and side porting may be provided and are within the scope of the present invention.

Figure 3:
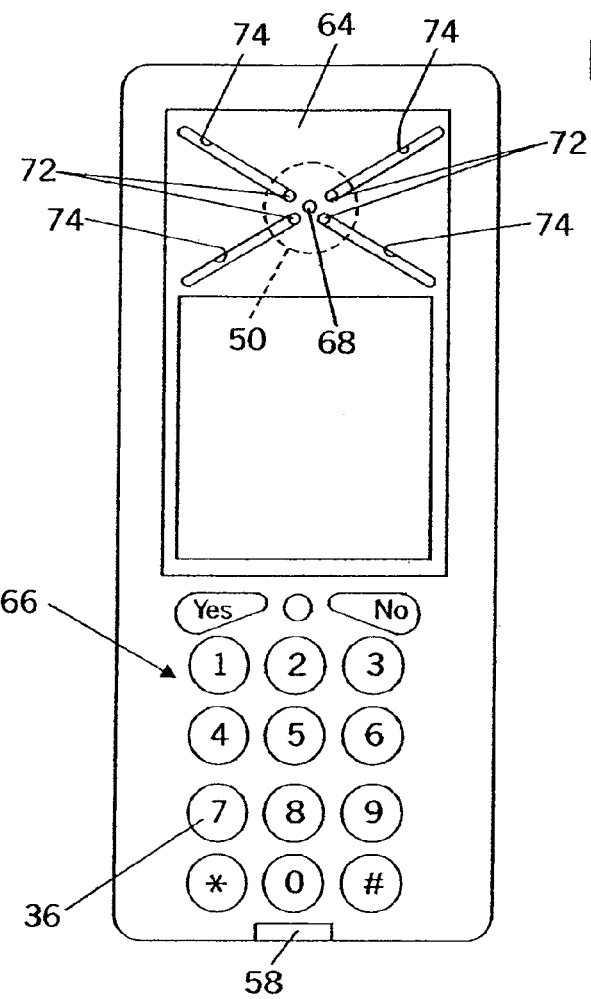
FIG. 3 is a cut-away front elevation view of the cellular phone of FIG. 2.
Figure 4:
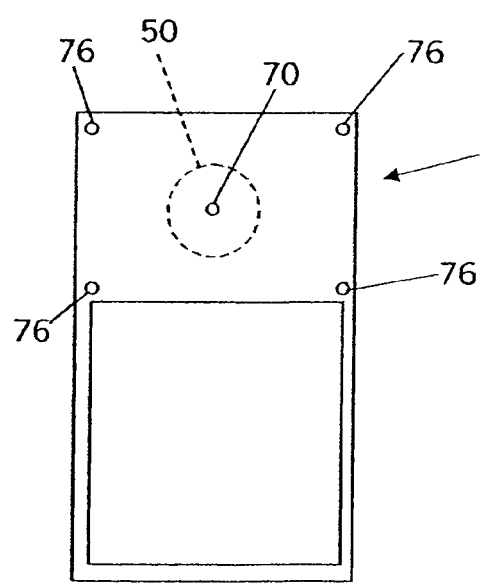
FIG. 4 is a front elevation view of an embodiment of a bezel, to be added to the cellular phone of FIG. 3.
Figure 5:
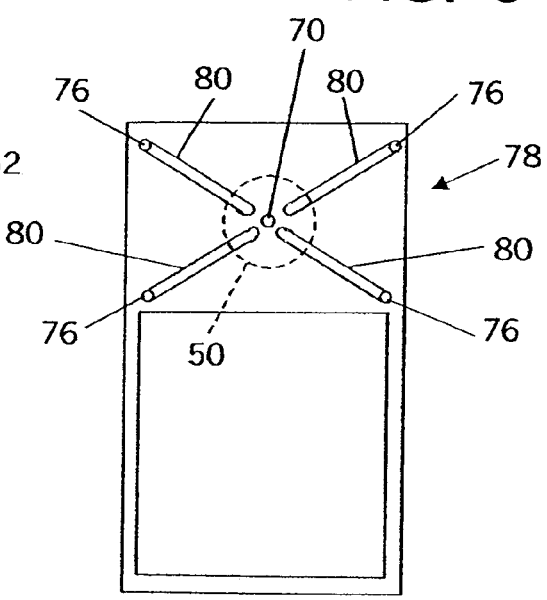
FIG. 5 is a rear elevation view of an additional embodiment of a bezel, again to be added to the cellular phone of FIG. 3.

FIGS. 3 and 4 respectively show the front housing 63 with the bezel 62 removed, and the front of the bezel 62. As previously noted, the ports 72 through the listening area 64 connect to channels 74, which direct the sound to bezel ports 76 that are outside the ear sealing region 50. The back of the bezel 62 may be flat with the channels 74 made by recesses in the front face recessed area 64. In one alternative embodiment shown in FIG. 5, showing a back view of a bezel, the bezel 78 may include channels 80 that either match up to the channels 74 of FIG. 3, or the listening area 64 of the front housing 63 may be flat.

Figure 6:
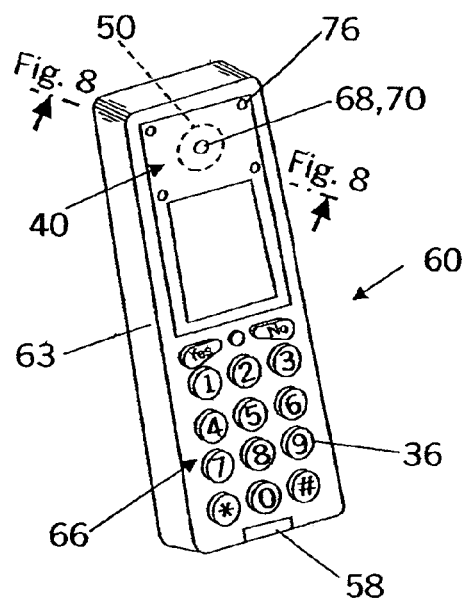
FIG. 6 is a perspective view of the cellular phone of FIG. 2.
Figure 7:
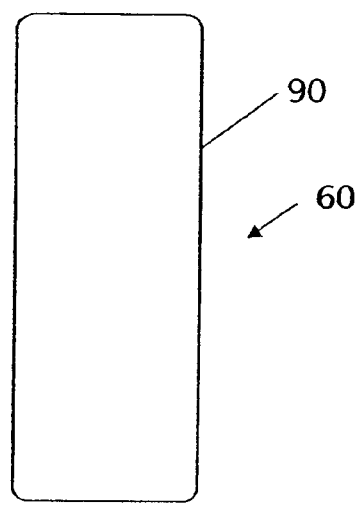
FIG. 7 is a rear elevation view of the cellular phone of FIG. 6.
Figure 8:
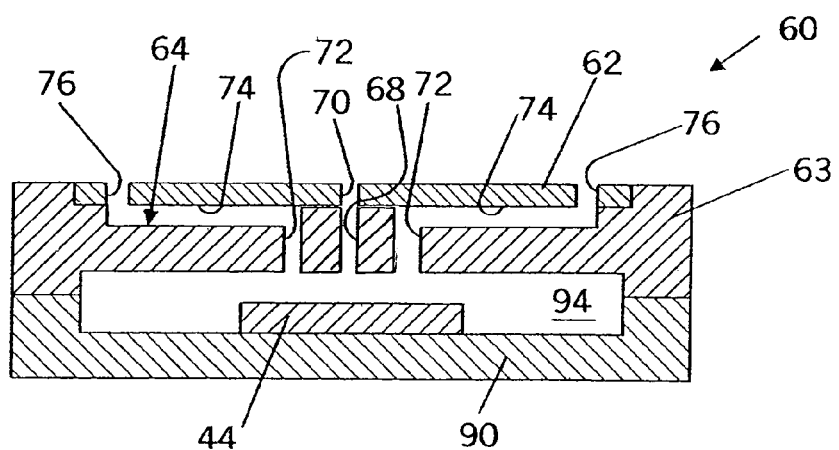
FIG. 8 is a section view of the cellular phone shown in FIG. 6.

FIGS. 6 and 7 show the embodiment of FIGS. 2–5 in perspective and back elevation views respectively. FIG. 6 shows that there are no side or top ports in this embodiment, although there may be in alternate embodiments, and FIG. 7 shows no ports in the back housing 90 although side or back ports could be provided. The cross-section for the embodiment of FIGS. 2–5 is shown in FIG. 8. The front housing 63 and the back housing 90 form an acoustic cavity enclosure 94. The terms front housing and back housing refer to elements required to form a complete housing and enclosure. It should be understood that the acoustic cavity can be enclosed by different components, for example, with side walls that are either integral with or attached to the front housing, back housing, or both. The back housing 90 may be the rear of the mobile terminal, or it may be a partition within the mobile terminal. If the back housing 90 is a partition, it may be ported to an adjacent acoustic cavity, which in turn may be ported to the mobile terminal's rear, sides, or both. The channels 74 extend generally laterally with respect to the listening area between ports 72 in the front housing 63 and ports 76 in the bezel 62, and are generally perpendicular to the axes of the ports 72, 76.

Although the channels 74 (FIGS. 2, 3, and 8), 80 (FIG. 5), 102 (FIG. 9), 112 (FIG. 11) are shown as being formed with a bezel, other means for creating channels in accordance with the present invention are available. Use of a bezel is not required. The term plate is used herein interchangeably with bezel and means any generally planar member that may be used to form channels. For example, a separate plate or other piece with recessed area and within the front housing may form the channels. Alternatively, recessed areas in the front housing opposing a flat inside plate or other piece may from the channels. The channels may be any cross-sectional shape.

An alternative embodiment is shown in FIGS. 9–11. In FIGS. 9 and 10, eight ports 100 are oriented around the central port 68, each with a channel 102 extending outwardly to ports 104 of the bezel 105. The channels 102 are shown in the recessed area 106 of the front housing's 108 front face 110. As an alternative embodiment similar to that of FIG. 5, the back view of the bezel 112 of FIG. 11 shows that the bezel 112 may include channels 114 that either match up to the channels 102 of FIG. 9, or the listening area 106 of the front housing 108 may be flat.

One of ordinary skill in the acoustic arts will quickly recognize that the invention has other applications in other environments. It will also be understood by someone of ordinary skill in the art that the porting geometries discussed and illustrated herein are not necessarily the most efficient or desirable to create the proper SPL or tonal qualities. In fact, many embodiments and implementations are possible. For example, the shapes, sizes, and configurations of the ports and channels may be varied from those discussed without departing from the scope of the present invention. The following claims are in no way intended to limit the scope of the invention to the specific embodiments described. It should be understood by those skilled in the art that the foregoing modifications as well as various other changes, omissions and additions may be made without parting from the spirit and scope of the present invention.

What is claimed is:

1. A mobile terminal for providing sound pressure level dissipation of sound from a transducer comprising:
   a front housing having a front face and a rear face, the front housing having a listening area and at least one first port therethrough;
   a back housing mounted to the front housing to form an enclosure in which the transducer is disposed;
   a plate mounted to the front face or rear face, the plate having at least one first port therethrough not axially aligned with the at least one first port through the front housing listening area; and
   at least one channel extending generally perpendicularly from the axis of and laterally between the at least one first port through the front housing and the at least one first port through the plate.

2. A mobile terminal as recited in claim 1, further comprising an ear-sealing region central to the front housing listening area, at least one second port through the front housing, and at least one second port through the plate, wherein the at least one second port through the front housing is axially aligned with the at least one second port through the plate, both within the ear-sealing region.

3. A mobile terminal as recited in claim 2, wherein the plate is mounted to the rear face of the front housing, the at least one first port through the plate is within the ear-sealing region, and the at least one first port of the front housing is outside the ear-sealing region.

4. A mobile terminal as recited in claim 2, wherein the plate is mounted to the front face of the front housing, the at least one first port through the front housing is within the ear-sealing region, and the at least one first port through the plate is outside the ear-sealing region.

5. A mobile terminal as recited in claim 1, wherein the at least one channel comprises a recess in a group selected from the front housing, the plate, and a combination thereof.

6. A mobile terminal as recited in claim 1, wherein the at least one channel comprises a duct inserted between the front housing and the plate.

7. A mobile terminal as recited in claim 1, wherein the enclosure is sealed from outward propagation of sound on all sides except for the front.

8. A mobile terminal as recited in claim 1, wherein a single transducer is the sole means for producing sound to be heard by the user.

9. A mobile terminal as recited in claim 1, wherein the back housing comprises a rear external surface of the mobile terminal.

10. A mobile terminal as recited in claim 1, wherein the back housing comprises a partition within the mobile terminal.

11. A mobile terminal for providing sound pressure level dissipation of sound from a transducer comprising:
   a front housing having a front face and a listening area, the front housing having at least one first port and at least one second port therethrough within the listening area;
   a back housing coupled to the front housing to form an enclosure in which the transducer is disposed;
   a bezel mounted to the front face, covering the listening area, the bezel having at least one port central to the listening area approximately coaxial with each respective at least one first port, and at least one port distal from the bezel central port; and
   at least one channel between the bezel and the front housing extending generally perpendicularly from the axis of and laterally away from the at least one second port to the at least one distal port through the bezel.

12. A mobile terminal as recited in claim 11, further comprising an ear-sealing region central to the front housing listening area, wherein the at least one second port through the front housing is axially aligned with the at least one central port through the bezel, both within the ear-sealing region.

13. A mobile terminal as recited in claim 12, wherein the at least one first port through the front housing is within the ear-sealing region, and the at least one distal port through the bezel is outside the ear-sealing region.

14. A mobile terminal as recited in claim 12, wherein the at least one channel comprises a recess in a group selected from the front housing, the bezel, and a combination thereof.

15. A mobile terminal as recited in claim 11, wherein the at least one channel comprises a duct inserted between the front housing and the bezel.

16. A mobile terminal as recited in claim 11, wherein the enclosure is sealed from outward propagation of sound on all sides except for the front.

17. A mobile terminal as recited in claim 11, wherein a single transducer is the sole means for producing sound to be heard by the user.

18. A mobile terminal as recited in claim 11, wherein the back housing comprises a rear external surface of the mobile terminal.

19. A mobile terminal as recited in claim 11, wherein the back housing comprises a partition within the mobile terminal.

20. A mobile terminal for providing sound pressure level dissipation of sound from a transducer comprising:
   a front housing having a listening area, an ear-sealing region within the listening area, a front face, and a rear face;
   a back housing mounted to the front housing to form an enclosure in which the transducer is disposed;
   first means for transmitting sound to the ear-sealing region, wherein the first means comprise at least one first port through the front housing, and a plate mounted to the front face or rear face, the plate having at least one first port therethrough generally coaxial with the at least one first port through the front housing; and
   second means for transmitting sound from within the ear-sealing region to the listening area outside of the ear-sealing region, wherein the second means comprise at least one second port through the front housing and at least one second port through the plate not coaxial with the at least one second port through the front housing, and at least one channel extending generally perpendicularly from the axis of and laterally between the at least one second port through the front housing and the at least one second port through the plate.

21. A mobile terminal as recited in claim 20, wherein the plate is mounted to the rear face of the front housing, the at least one second port through the plate is within the ear-sealing region, and the at least one second port of the front housing is outside the ear-sealing region.

22. A mobile terminal as recited in claim 20, wherein the plate is mounted to the front face of the front housing, the at least one second port through the front housing is within the ear-sealing region, and the at least one second port through the plate is outside the ear-sealing region.

23. A method for providing sound pressure dissipation of sound from a transducer in a mobile terminal, the method comprising the steps of:
   providing a front housing having a front face and a rear face, the front housing having a listening area and at least one first port therethrough;
   providing a back housing mounted to the front housing to form an enclosure in which the transducer is disposed;
   providing a plate mounted to the front face or rear face, the plate having at least one first port therethrough not axially aligned with the at least one first port through the front housing listening area; and
   providing at least one channel extending generally perpendicularly from the axis of and laterally between the at least one first port through the front housing and the at least one first port through the plate.

* * * * *